Oct. 22, 1963  S. M. BAGNO  3,108,191
BATTERY NETWORK
Filed Feb. 15, 1961

INVENTOR
SAMUEL M. BAGNO
BY Ernest A. Joeren
ATTORNEY

United States Patent Office 3,108,191
Patented Oct. 22, 1963

3,108,191
BATTERY NETWORK
Samuel N. Bagno, Belleville, N.J., assignor to Specialties Development Corporation, Belleville, N.J., a corporation of New Jersey
Filed Feb. 15, 1961, Ser. No. 89,392
7 Claims. (Cl. 307—66)

The present invention relates to battery networks, and, more particularly, to networks where a load is normally operated by a power source and a storage battery is connected across the load and the power source to operate the load in the event of failure of the power source.

In networks of the foregoing type, provision is made to maintain the battery charged so that it can take over upon failure of the power source to properly operate the load. However, in instances where the load is of the type that can fail or eventually will fail because of an inherent limited useful life, such as is the case with a lamp, the power source will overcharge the battery and will cause the battery to burn out unless the power source is disconnected.

Heretofore, attempts have been made to protect the battery against such contingencies by the use of electro-mechanical switching devices such as relays which have inherent disadvantages including high cost, prone to failure and corrodable contacts.

Accordingly, an object of the present invention is to provide a network which is simple, highly reliable and less expensive than networks utilized heretofore.

Another object is to provide such a network which assures that the battery is charged to a voltage sufficient to properly operate the load.

A further object is to accomplish the foregoing without the use of electro-mechanical switching devices.

Other and further objects of the invention will be obvious upon an understanding of the illustrative embodiment about to be described, or will be indicated in the appended claims, and various advantages not referred to herein will occur to one skilled in the art upon employment of the invention in practice.

In accordance with the present invention, the foregoing objects are generally accomplished by providing a transistor having its base connected to a terminal of the load, having its collector connected to a terminal of the battery and having its emitter connected to a wire of the power source.

Figure 1:
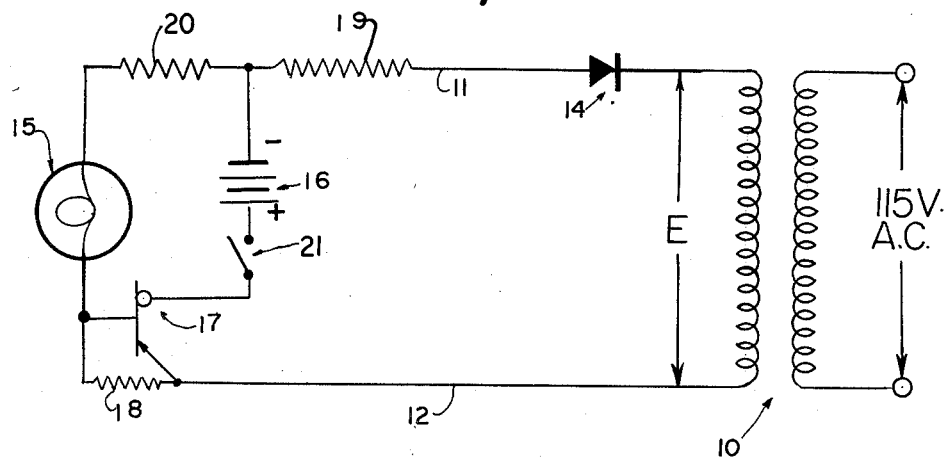
FIG. 1 is a wiring diagram of a network in accordance with the present invention wherein a rectified alternating current power source is utilized.

Referring to FIG. 1 of the drawing in detail, a network is shown which generally comprises a power source including a transformer 10 having its input connected to a supply of A.C. and having wires 11 and 12 connected to its output, and a rectifier 14 connected in the wire 11; an electrical load herein illustrated as a lamp 15 which may be utilized to cast a beam of light onto a photoelectric cell; a storage battery 16; and a transistor 17.

In the illustrative embodiment, the transistor 17 is of the P–N–P type, and has its base connected to one terminal of the lamp, has its emitter connected to the wire 12 and has its collector connected to the positive terminal of the battery.

The other terminal of the lamp, in series with a resistor 20, is connected to the negative terminal of the battery; and a resistor 19 is connected in the wire 11 between the negative battery terminal and the rectifier 14. The terminal of the lamp which is connected to the base of the transistor is connected to the wire 12, if desired through a resistor 18 which can maintain a low voltage drop between the base and emitter of the transistor.

A switch 21 is provided for disconnecting the lamp 15 from the battery 16 to prevent the battery from discharging when the source of power has been disconnected.

Figure 2:
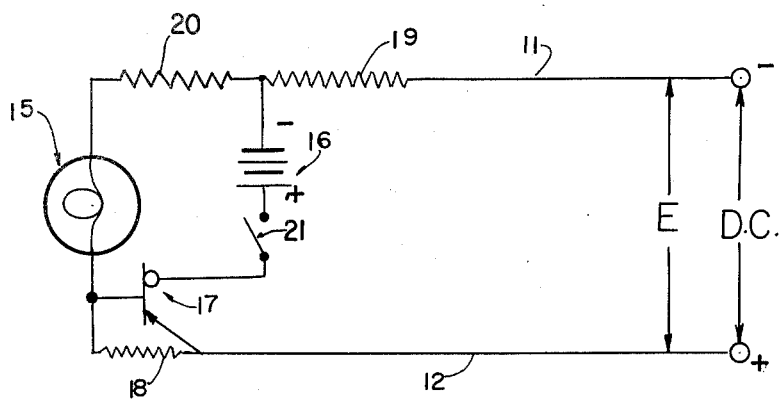
FIG. 2 is a similar view wherein a direct current power source is utilized.

The network shown in FIG. 2 is identical to that shown in FIG. 1 except that the transformer 10 and the rectifier 14 are omitted and that the wires 11 and 12 are connected directly to a supply of D.C. The networks shown in FIGS. 1 and 2 function in the same manner except that in FIG. 1 pulsating D.C. is supplied as the source of unidirectional current for the lamp and the storage battery.

In a practical network in accordance with the present invention, the supplied voltage E may be 12 volts, the battery may have a voltage of 6 volts, the lamp may have a resistance of about 12 ohms (2 watts at about 5 volts), the resistor 18 may have a resistance of several hundred ohms or for most purposes it may be omitted entirely, and the resistor 19 may have a resistance of 12 ohms to reduce the supplied voltage E to about 3.6 volts across the lamp and the battery. The transistor may be a one ampere power transistor.

In operation while the lamp is functioning, the lamp is powered by the power source and the battery is maintained charged to a voltage slightly higher than the voltage required by the lamp. This is accomplished by having an excess voltage drop occur across the resistor 20.

In the event the power source fails, the battery powers the lamp and maintains it illuminated. This occurs because the base collector function of the transistor then serves as a diode connected in the conducting direction whereby the battery can discharge across the lamp and keep it illuminated.

In the event the lamp burns out or fails otherwise, the transistor acts like a drop out relay by reason of the fact that the base collector function then acts as a forward conducting diode.

By the proper adjustment of the resistor 19 the D.C. average current supplied by the rectifier 14 (FIG. 1) or by the D.C. current source (FIG. 2) can be made very slightly in excess of the lamp current by just the value sufficient to supply the battery losses, whereby the battery is prevented from being overcharged by the power source.

From the foregoing description, it will be seen that the present invention provides an improved network for preventing storage batteries from being overcharged and damaged which is simple, practical and economical in construction and is reliable in operation.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

I claim:

1. In a network of the class described, the combination of a power source having two wires, an electrical load having one terminal connected to one wire of said source, a storage battery having one terminal connected to said one wire, and a transistor having its base connected to the other terminal of said load, having its collector connected to the other terminal of said battery and having its emitter connected to the other wire of said source, whereby said transistor electrically connects said battery for discharge across said load and upon failure of said load said transistor electrically disconnects said battery from said power source.

2. A network according to claim 1, wherein a resistor is connected between the base and the emitter of said transistor.

3. A network according to claim 1, wherein a resistor is connected in one wire of said source to limit the flow of current through said battery.

4. A network according to claim 1, wherein a resistor is connected between said load and one terminal of said battery.

5. A network according to claim 1, wherein a switch is provided for disconnecting said load and said battery.

6. A network according to claim 1, wherein said power source supplies unidirectional current.

7. A network according to claim 1, wherein said power source supplies alternating current and includes a transformer and a rectifier.

References Cited in the file of this patent

UNITED STATES PATENTS

| | | |
|---|---|---|
| 1,865,595 | Spangler | July 5, 1935 |
| 2,062,274 | Rees | Nov. 24, 1936 |
| 3,002,105 | Cady | Sept. 26, 1961 |
| 3,060,320 | Wiley | Oct. 23, 1962 |

FOREIGN PATENTS

| | | |
|---|---|---|
| 1,227,170 | France | Aug. 22, 1960 |